US005113274A

United States Patent [19]

Takahashi et al.

[11] Patent Number: 5,113,274

[45] Date of Patent: May 12, 1992

[54] MATRIX-TYPE COLOR LIQUID CRYSTAL DISPLAY DEVICE

[75] Inventors: Seiki Takahashi; Hayato Takasago, both of Amagasaki, Japan

[73] Assignee: Mitsubishi Denki Kabushiki Kaisha, Tokyo, Japan

[21] Appl. No.: 362,942

[22] Filed: Jun. 8, 1989

[30] Foreign Application Priority Data

Jun. 13, 1988 [JP] Japan ................ 63-146277

[51] Int. Cl.[5] ................ G02F 1/13

[52] U.S. Cl. ................ 359/66; 359/54; 359/57

[58] Field of Search ................ 350/333, 334, 339 F, 350/347 E

[56] References Cited

U.S. PATENT DOCUMENTS 4,855,724 8/1989 Yang ................ 350/339 F
4,907,862 3/1990 Suntola ................ 350/339 F

FOREIGN PATENT DOCUMENTS 0341003 11/1989 European Pat. Off. ........ 350/339 F
0131522 7/1985 Japan ................ 350/333
0207118 10/1985 Japan ................ 350/333
2133912 8/1984 United Kingdom ........ 350/339 F
2146478 4/1985 United Kingdom ........ 350/333

OTHER PUBLICATIONS

1985 International Display Research Conference, pp. 24–26 Color Pixel Arrangement Evaluation For LC–TV.

*Primary Examiner*—Rolf Hille
*Assistant Examiner*—Tan Ho
*Attorney, Agent, or Firm*—Morrison Law Firm

[57] ABSTRACT

A matrix-type color liquid crystal display device comprises display units each comprising each one of red (R), green (G) and blue (B) color pixels arranged in such a manner that R and B pixels on opposite sides of each G pixel belong also to adjacent display units. The R and B signals for that display unit to which the G pixel between R and B pixels of interest belongs are appropriately modified before they are applied to the R and B pixels, whereby the number of required pixels can be reduced.

8 Claims, 5 Drawing Sheets

MATRIX-TYPE COLOR LIQUID CRYSTAL DISPLAY DEVICE

This invention relates to a matrix-type color liquid crystal display device and, more particularly, to optimization of a color pixel array and input signal compensation therefor.

BACKGROUND OF THE INVENTION

FIG. 1 is a plan view of a conventional color pixel array shown in *The Journal of The Institute of Electronics and Communication Engineers of Japan, Image Engineering Society*, Jun. 20, 1986, Page ED-3961. In FIG. 1, one display unit 4*a* or 4*b* comprises a red (R) pixel 1, a green (G) pixel 2 and a blue (B) pixel 3. That is, one display unit comprises respective ones of R, G and B pixels.

The amount of light transmitted through each of the color pixels is controlled by a liquid crystal light switch which, in turn, is opened or closed by a display signal applied from a driver circuit section (not shown in FIG. 1), and, thus, color display is provided. Typically, with this color pixel array, information display is provided by applying input display signals to display units such as 4*a* and 4*b* each comprising one of each of the three color pixels R, G and B.

According to the prior art display unit arrangment, each display unit includes its own three color pixels. Accordingly, when it is desired to realize large-capacity, high-density information display, the number of pixels increases, which causes problems including the following ones.

(1) Because of a large number of pixels, the number of conductors for the pixels also becomes larger, which may increase occurrences of short-circuiting and conductor breakage. Therefore, the yield of liquid crystal display panels is low, which in turn causes increase of panel manufacturing costs.

(2) For a given display area, an increase in the number of pixels causes the area of one pixel to decrease so that the aperture ratio (percentage of the effective display area) of the entire display device also decreases and display quality decreases. (The non-aperture area (optically ineffective area) of one pixel is determined by the areas of the wiring section and switching elements (such as TFT's) and is constant. Therefore, if the area of one pixel decreases, the aperture ratio also decreases.)

(3) As the number of the pixels increases, the number of elements used in the driver circuit section also increases so that the spacing between lead-out terminals becomes small, which requires high-density packaging. Thus, the packaging costs increase.

SUMMARY OF THE INVENTION

The object of the present invention is to provide a liquid crystal display device which is free of the above-stated disadvantages of prior art display devices. The liquid crystal display device of the present invention requires less pixels than the prior art and still provides accurate information display.

According to the present invention, a liquid crystal display device includes a color pixel array in which a quartet comprising pixels arranged in the order G, R, G, B, or G, B, G, R, or R, G, B, G, or B, G, R, G, is repeated. A display unit comprises one G pixel and R and B pixels on opposite sides of that G pixel. As for signals for R and B pixels on opposite sides of the center G pixel, corresponding signals for the same display unit which that center G pixel belongs to are modified to have an optimum magnitude and, thereafter, applied to those R and B pixels.

DETAILED DESCRIPTION OF PREFERRED EMBODIMENTS

Now, the present invention is described by means of examples shown in the accompanying drawings.

Figure 1:
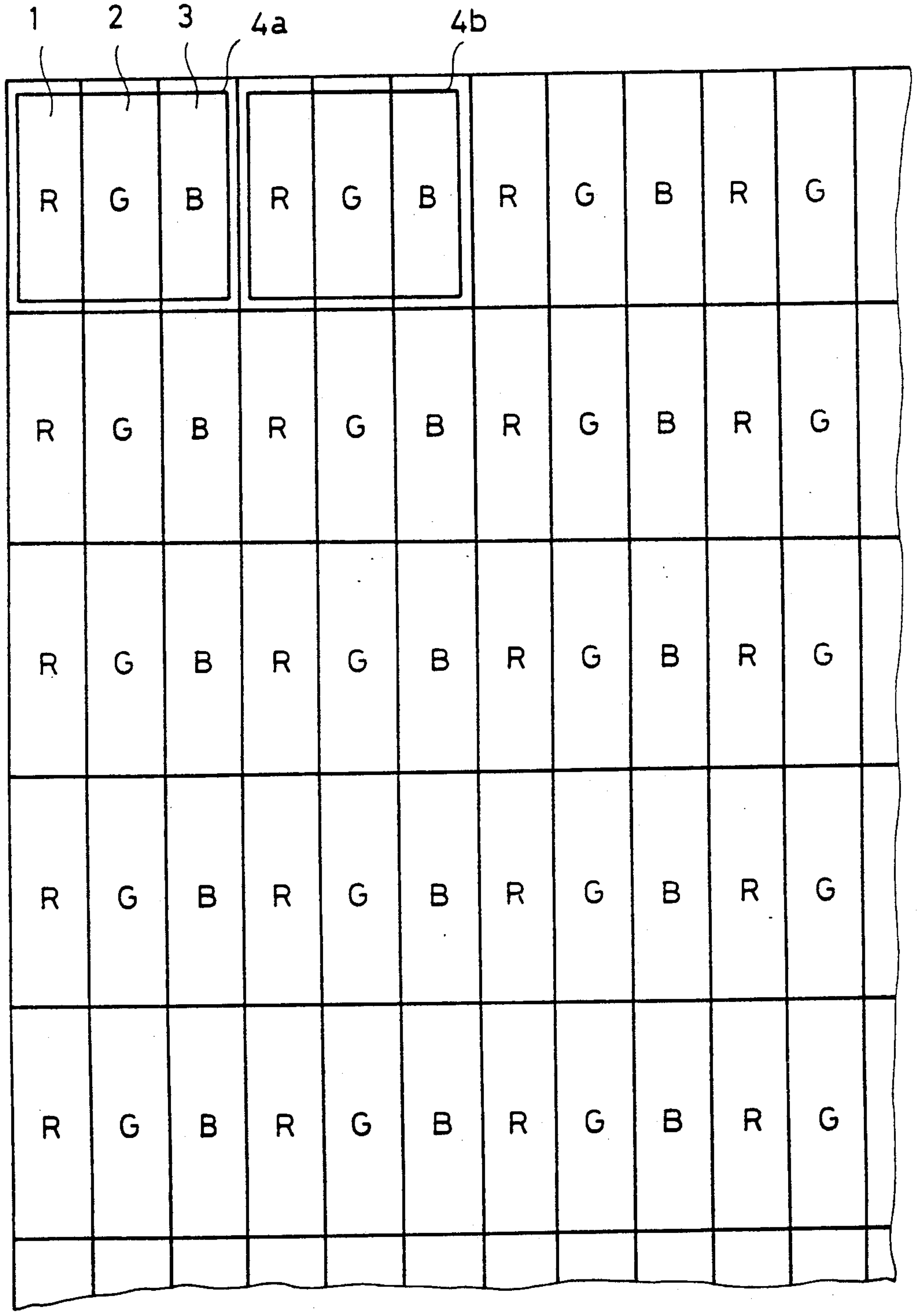
FIG 1 PRIOR ART
FIG. 1 shows a color pixel arrangement of a prior art color liquid crystal display device.
Figure 2:
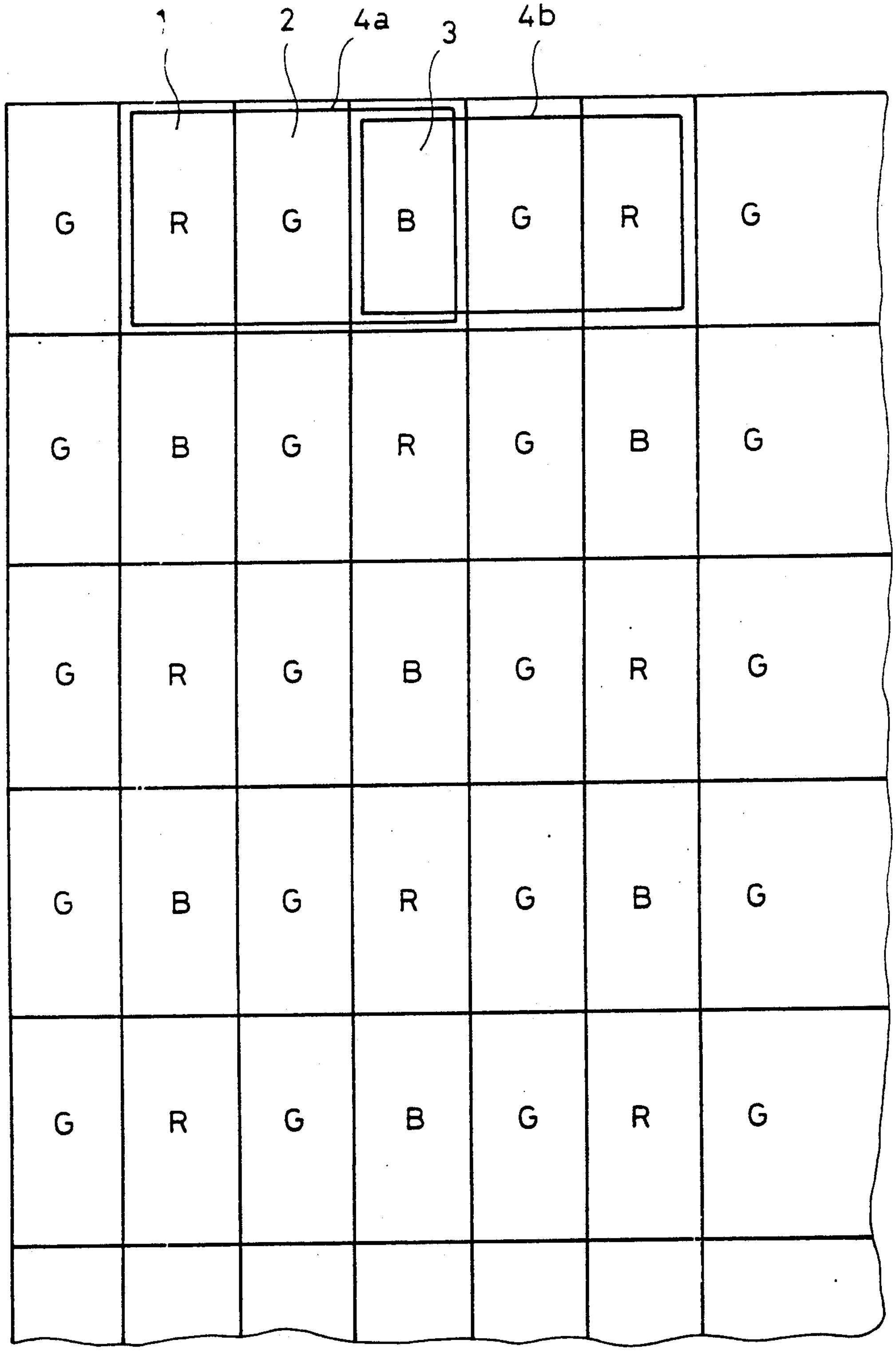
FIG. 2 shows a color pixel arrangement of a color liquid crystal display device according to one embodiment of the present invention.

FIG. 2 is a plan view of a color pixel array of a liquid crystal display device according to one embodiment of the present invention. In FIG. 2, the reference numerals 1, 2, 3, 4*a* and 4*b* denote the same components and functions as in FIG. 1. In the color pixel array of FIG. 2, G, R, G and B pixels arranged in the named order in the horizontal direction form a quartet, and this quartet successively is repeated. The phases of one row of the pixels and the next differ by one-half cycle. In this embodiment, one display unit comprises a green (G) pixel 2 and red (R) and blue (B) pixels 1 and 3 adjacent to the G pixel 2 on its opposite sides. Accordingly, for a given total number of display units of a display device, the number of pixels in the vertical direction is same as the number in the prior art device. But the number of pixels in the horizontal direction is two-thirds the number of pixels in the horizontal direction in the prior art device. This is because, as shown in FIG. 1, in the conventional display device, one of each of color pixels R, G and B belongs to one color display unit, while, in the color pixel array of the present invention, although each of the green pixels G belongs to only one display unit, R and B pixels on opposite sides of that center G pixel belong also to display units on opposite sides of the display unit to which that G pixel belongs. Accordingly, for a given number, n, of the total display units of the display device, 3 n color pixels are required in the conventional device, while the display device of the present invention requires only $[n+(n/2)\times 2+1]=2n+1$ pixels.

Figure 3:
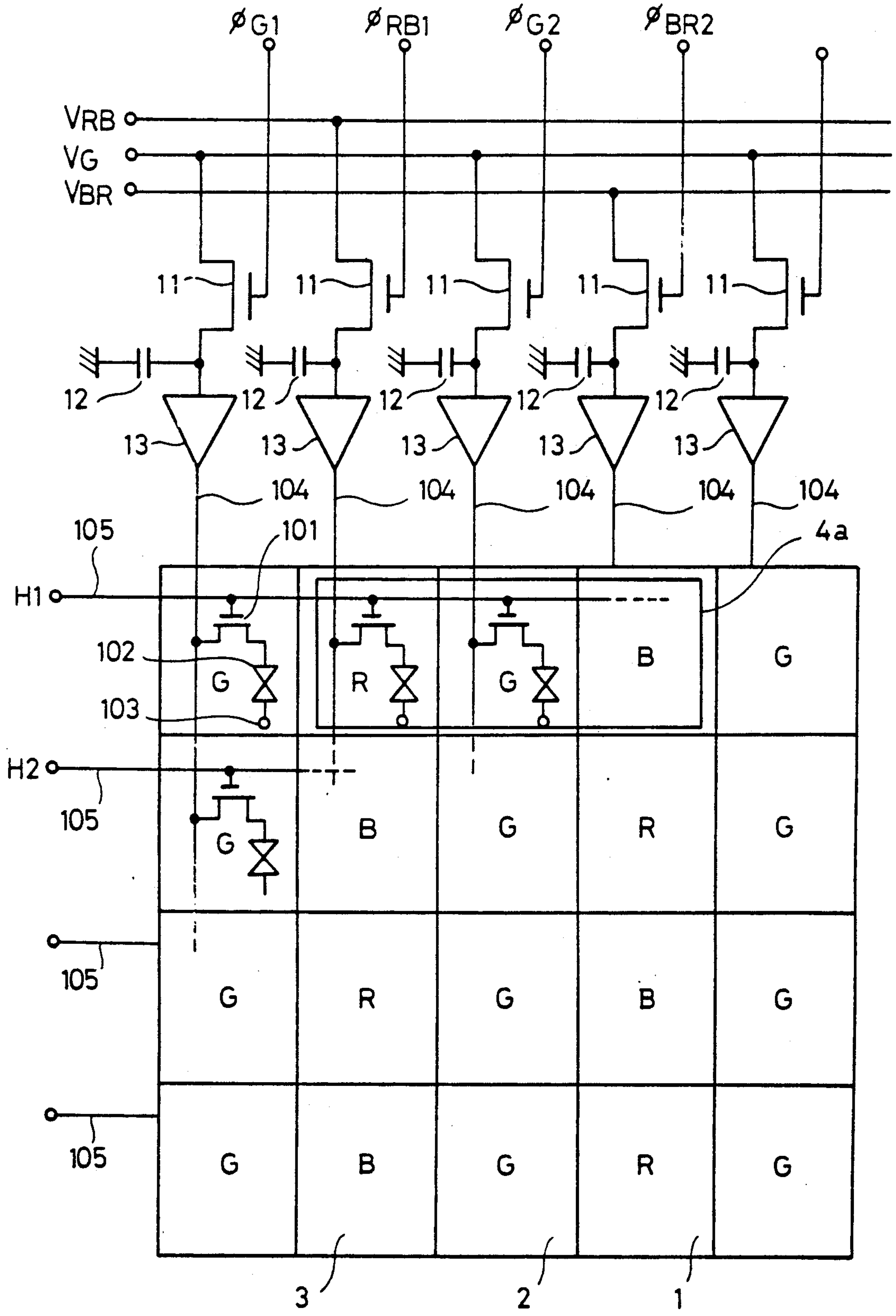
FIG. 3 is an equivalent circuit diagram of a color liquid crystal display device of the present invention.

FIG. 3 is an equivalent circuit diagram of the liquid crystal display device shown in FIG. 2 including a display signal driver section. 11 denotes sampling gates of the display signal driver section; 12 denotes display signal holding capacitances of the display signal driver section; 13 denotes buffers of the display signal driver section; 101 denotes TFT's; 102 denotes liquid crystal layers; 103 denotes common electrodes; 104 denotes display signal conductors; 105 denotes horizontal scanning signal conductors; $V_G$ denotes a G display signal; $V_{RB}$ denotes an R/B display signal; $V_{BR}$ denotes a B/R display signal; $\phi_{G1}$ denotes a first G digital signal (i.e. signal for sampling $V_G$ signal); $\phi_{RB}$ signal); $\phi_{G2}$ denotes a second G digital signal; $\phi_{BR2}$ denotes a second B/R digital signal (i.e. signal for sampling $V_{BR}$ signal); H1 denotes a first horizontal scanning signal; and H2 denotes a second horizontal scanning signal.

Figure 4:
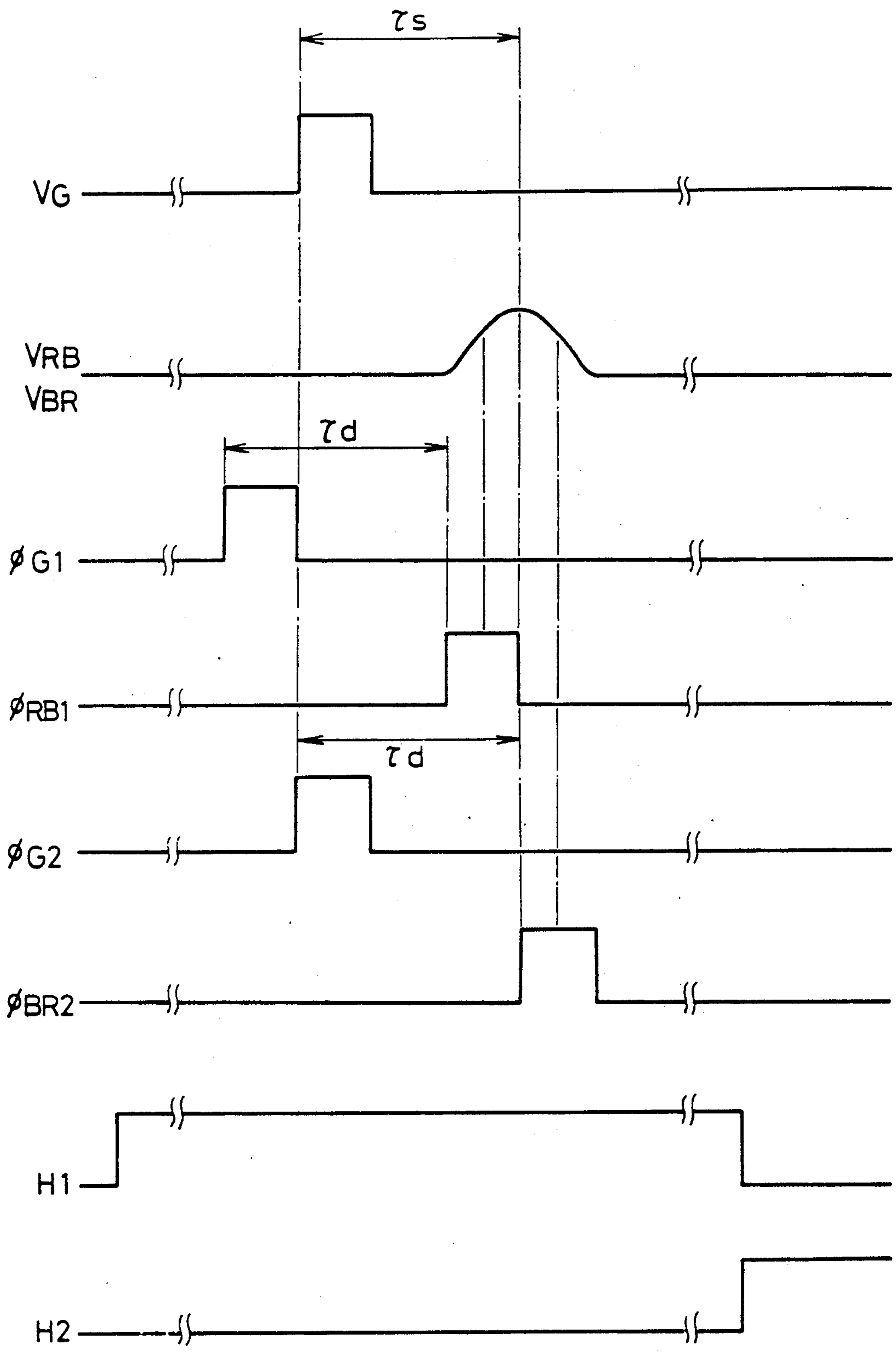
FIG. 4 shows timing relationship of waveforms in the liquid crystal display device of FIG. 3.

The liquid crystal display section of the device shown in FIG. 3 includes the TFT's (thin film transistors) 101 for switching the liquid crystal, display signal conductors 104 for applying the display signals to the respective TFT's 101, and horizontal scanning signal conductors 105 for applying the horizontal scanning signals to the TFT's 101. The display signal driver section external to the liquid crystal display section includes the sampling gates 11, the display signal holding capacitances 12 and the buffers 13. The sampling gates 11 are supplied with associated $\phi_{G1}$, $\phi_{RB1}$, $\phi_{G2}$ and $\phi_{BR2}$ digital signals and the $V_{RB}$, $V_G$ and $V_{BR}$ display signals, which results in output signals at the outputs of the buffers 13. The buffer output signals are developed on the display signal conductors 104. The horizontal scanning signal conductors 105 are supplied with the horizontal scanning signals H1 and H2. FIG. 4 shows the timing relationship of the respective inputs signals. In FIG. 4, $\tau_s$ is a delay time of the display signals, and $\tau_d$ is a delay time of the digital signals.

Now, the operation of the liquid crystal display device of FIG. 3 is explained with an assumption that ON display signals are applied to one display unit 4a.

The signals $V_{RB}$ and $V_{BR}$ are modified by signal modifying and processing circuitry so as to have a broader width and to be delayed by $\tau_s$, relative to the signal $V_G$, as shown in FIG. 4. Also, the signals $\phi_{RB1}$ and $\phi_{BR2}$ are delayed by $\tau_d$ relative to the signals $\phi_{G1}$ and $\phi_{G2}$, respectively. As a result, at the output of the sampling gate 11 of the driver section associated with the G pixel, the G display signal appears as it is, while, at the outputs of the sampling gates associated with the R and B pixels on opposite sides of the G pixel, the R and B display signals as modified to have an optimum magnitude (i.e. a magnitude between zero and the magnitude before the modification) appear. When the buffers 13 in the driver section are enabled, the display signals at the outputs of the respective sampling gates 11 are fed onto the associated display signal conductors 104, so that the display unit 4a having TFT's to which the horizontal scanning signal H1 in its ON state is applied is turned on. In this way, the signal modifying and processing circuit of this invention is used for broadening and delaying the signals $V_{RB}$ and $V_{BR}$ by $\tau_s$ relative to the signal $V_G$ and also delaying the signals $\phi_{RB1}$ and $\phi_{BR2}$ by $\tau_d$ relative to the signals $\phi_{G1}$ and $\phi_{G2}$, respectively, such that the G display signal is applied without being modified to the G pixels, while the R and B display signals are applied, after being modified to have optimum magnitudes, to adjacent R and B pixels. The signal modifying and processing circuit may employ analog delay elements or digital delay elements. Alternatively, this circuit may be realized by employing analog circuits having different propagation characteristics for $V_{RB}$, $V_{BR}$ and $V_G$. The reason why the R and B signals must be modified is that, since each of the R and B pixels belongs to two display units, if unmodified display signals are applied to them, the amounts of light from them will become undesirably larger than that of the G pixel of the display unit to which they currently belong.

According to the present invention, the number of the G pixels is twice that of each of the R and B pixels, which may not produce a proper white display. For proper white production, any suitable optimization procedures such as follows may be taken.

(1) Optimization of the transmission characteristics of R, G and B color filters:

For example, when color filters formed by a dyeing technique are used, the degree of dyeing for G color filter may be made greater than those for R and B filters, or the thickness of the G color filter may be made greater than those of the R and B filters.

(2) The light wavelength characteristic of the backlight source should be optimized:

For example, the composition of the fluorescent material used for the backlight source may be chosen such that the percentage of G light is smaller than those of R and B light emitted from it.

In the present invention, in order to optimize the viewing angle dependence in a gray scale for the R and B pixels used to display information, any suitable techniques such as follows may be employed.

(1) Optimization of liquid crystal characteristics, a gap value d of the liquid crystal layer (i.e. the spacing between facing electrodes between which the liquid crystal material is disposed) and a refractive index anisotropy $\Delta n$ of the liquid crystal material:

For example, the product of $\Delta n$ by d, $\Delta n \cdot d$, may be set to be small, e.g. 0.5 micrometers or so.

(2) Optimization of polarization plate angles:

For example, the angle of one of polarization plates which are in a normally-black parallel Nicol state may be set to be 40° and that of the other may be set to be 50° when the surface liquid crystal alignment angles are 45° and −45°.

Figure 5:
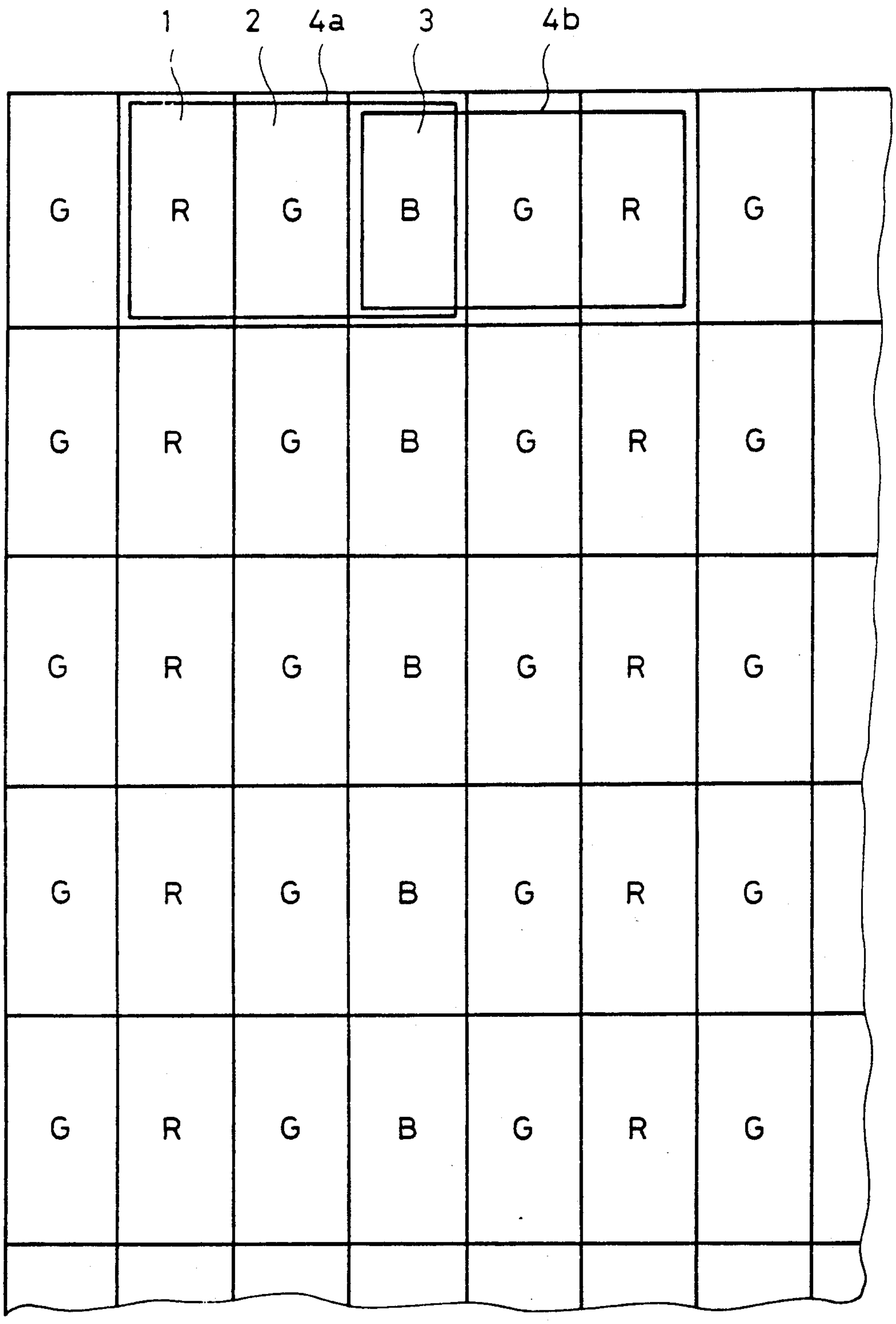
FIG. 5 shows a color pixel arrangement of a color liquid crystal display device according to another embodiment of the present invention.

In the embodiment described in the above, the phase of the second row of the pixels is shifted by one-half the cycle from the first row. However, it should be noted that as shown in FIG. 5, the phases of the rows of pixels can be same. Also, it should be noted that the order of pixels arranged in cyclic quartets can be GBGR, RGBG or BGRG.

As stated above, according to the present invention, the number of pixels of a liquid crystal display device can be reduced to two-thirds the number required for prior art devices, and, as a result, the following advantages are provided.

(1) Because of the reduction in the number of pixels, the number of conductors can be reduced, so that the possibility of short-circuiting and breaking down of conductors is reduced and, hence, the yield of usable panels is improved.

(2) Because of the reduction in the number of pixels, the area of each pixel can be increased so that the aperture ratio of the display device of the present invention is larger. Accordingly, the quality of displayed picture is improved.

(3) The reduction in number of pixels makes it possible to reduce the number of components of the driver section, which in turn makes it possible to provide a larger spacing between adjacent terminals for connection to external circuits. Accordingly, the packaging cost can be reduced.

According to the present invention, G information can be displayed as in prior art display devices, and, since the signal modification is provided, R and B information can be displayed with almost the same quality as in prior art. Thus, the present invention makes it possible to manufacture, at low cost, liquid crystal display devices for displaying a large amount of high-density TV and alphanumeric information.

What is claimed is:

1. A matrix-type color liquid crystal display device comprising:

an array of successively repeating color pixel quartets each including one red (R) pixel, two green (G) pixels and one blue (B) pixel arranged in one of the following orders: G, R, G, B; G, B, G, R; R, G, B, G; and B, G, R, G;

signal modifying and processing means for preparing signals for R and B pixels on opposite sides of each of the G pixels by modifying signals to be applied to R and B pixels which belong to the same display unit as that G pixel so as to have an optimum magnitude which is between zero and the magnitude before the modification; and said signal modifying and processing means includes means for modifying and processing signals applied to a driver section for driving the color pixel array in such a manner as to broaden and delay signals to be applied to the R and B pixels relative to a signal to be applied to the G pixels, and also for optimizing the timing of sampling of said broadened and delayed signals applied to the G, B and R pixels.

2. A matrix-type color liquid crystal display device according to claim 1, wherein the means for modifying and processing includes one of analog delay elements and digital delay elements.

3. A matrix-type color liquid crystal display device according to claim 1, wherein difference of signal propagation characteristics for signals applied to the B and R pixels from that for signals applied to the G pixels is utilized for the modification of the signals applied to the B and R pixels.

4. A matrix-type color liquid crystal display device, comprising:

an array of successively repeating color pixel quartets, each of said quartets including one red (R) pixel, two green (G) pixels and one blue (B) pixel, said pixels arranged in an order selected of one of the following orders: G, R, G, B; G, B, G, R; R, G, B, G; and B, G, R, G;

a plurality of display units, each of said display units comprising at least one of said R pixels, at least one of said G pixels, and at least one of said B pixels;

said at least one G pixel of said each display unit is a central pixel situated between said at least one R and at least one B pixels, and wherein said at least one R and at least one B pixels are situated at the opposite sides of said G pixel and also belong to other, adjacent display units, so that B and R pixels are shared by adjacent display units;

means for modifying signals applied to said R and B pixels, said R, B and G pixels belonging to the same display unit, whereby an optimum magnitude is obtained, which is between zero and the magnitude before modification; and said means for modifying includes means for broadening and delaying signals to be applied to said R and B pixels relative to a signal to be applied to said G pixels.

5. The matrix-type color liquid crystal display device of claim 4, wherein said means for modifying includes analog delay elements.

6. The matrix-type color liquid crystal display device of claim 4, wherein said means for modifying include digital delay elements.

7. The matrix-type color liquid crystal display device of claim 4, wherein said means for modifying includes a difference of signal propagation characteristics for signals applied to said B and R pixels from that for signals applied to said G pixels.

8. A matrix-type color liquid display device, comprising:

an array of successively repeating color pixel quartets, each of said quarters including one red (R) pixel, two green (G) pixels and one blue (B) pixtel, said pixels arranged in an order selected of one of the following orders: G, R, G, B, or G, B, G, R, or R, G, B, G, or B, G, R, G;

a plurality of display units, each of said display units comprising at least one of said R pixels, at least one of said G pixels, and at least one of said B pixels;

said at least one G pixel of said each display unit is a central pixel situated between said at least one R and at least one B pixels, and wherein said at least one R and at least on B pixels are situated at the opposite sides of said G pixel and also belong to other, adjacent display units, so said B and R pixels are shared by adjacent display units;

means for modifying signals to be applied to said R and B pixels, said R, B, and G pixels belonging to the same display unit, whereby an optimum magnitude is obtained; and wherein:

said array forms horizontal rows, said rows positioned under each other in a vertical direction;

each R pixel in a horizontal row is vertically aligned with a corresponding B pixel in a horizontal row, and vice versa; and all G pixels in adjacent rows are aligned vertically.

* * * * *